United States Patent
Ramkumar et al.

(10) Patent No.: US 6,173,280 B1
(45) Date of Patent: Jan. 9, 2001

(54) METHOD AND APPARATUS FOR GENERATING WEIGHTED ASSOCIATION RULES

(75) Inventors: G D Ramkumar, Mountain View, CA (US); Sanjay Ranka, Gainesville, FL (US); Shalom Tsur, Mountain View, CA (US)

(73) Assignee: Hitachi America, Ltd., Tarrytown, NY (US)

( * ) Notice: Under 35 U.S.C. 154(b), the term of this patent shall be extended for 0 days.

(21) Appl. No.: 09/065,837

(22) Filed: Apr. 24, 1998

(51) Int. Cl.[7] ..................................................... G06F 17/30
(52) U.S. Cl. ................................................. 707/6; 707/102
(58) Field of Search .................................. 707/6, 1, 101, 707/102

(56) References Cited

U.S. PATENT DOCUMENTS

| | | | |
|---|---|---|---|
| 5,819,266 | * 10/1998 | Agrawal et al. | 707/6 |
| 5,842,200 | * 11/1998 | Agrawal et al. | 707/1 |
| 5,943,667 | * 10/1998 | Aggarwal et al. | 707/3 |
| 5,987,470 | * 11/1999 | Meyers | 707/102 |

OTHER PUBLICATIONS

*Fast Discovery of Association Rules*, by Agrawal, Mannila, Srikant, Toivenen and Verkamo.
*Mining Association Rules with Item Constraints*, by Srikant, Vu and Agrawal; IBM Alameden Research Center, 1997.
*Mining Association Rules between Sets of Items in Large Databases*, by Agrawal, Imielinski and Swami; ACM SIGMOD Conference, May 1993.
*Fast Algorithms for Mining Association Rules*, by Agrawal and Srikant; IBM Almaden Research Center.
*Dynamic Itemset Counting and Implication Rules for Market Basket Data*, by Brin, Motwani, Ullman and Tsur, May 1997.
*Parallel Mining of Association Rules: Design, Implementation and Experience* by Agrawal and Shafer; IBM Research Report, Feb. 1996.
*Mining Quantitative Association Rules in Large Relational Tables* by Srikant and Agrawal.
*New Reasoning Methods for Artificial Intelligence in Medicine*, by Kuipers; International Journal of Man–Machine Studies, vol. 26, No. 6.
*Hash Based Parallel Algorithms for Mining Association Rules* by Shintani and Kitsuregawa; University of Tokyo, Institute of Industrial Science.
*Finding Interesting Rules form Large Sets of Discovered Association Rules*, by Klemettinen, Mannila, Ronkainen, Toivenen and Verkamo; Third International Conference on Informaiton and Knowledge Management, Nov./Dec., 1994, ACM Press.
*Dynamic Itemset Counting and Implication Rules for Market Data*, by Brin et al, May 1997.*

* cited by examiner

*Primary Examiner*—Wayne Amsbury
(74) *Attorney, Agent, or Firm*—Flehr Hohbach Test Albritton & Herbert LLP

(57) ABSTRACT

The present invention discloses a data mining method and apparatus that assigns weight values to items and/or transactions based on the value to the user, thereby resulting in association rules of greater importance. A conservative method, aggressive method, or a combination of the two can be used when generating supersets.

20 Claims, 8 Drawing Sheets

METHOD AND APPARATUS FOR GENERATING WEIGHTED ASSOCIATION RULES

FIELD OF THE INVENTION

The present invention relates generally to a method and apparatus for uncovering relationships or association rules between items in large databases, and in particular to a method and apparatus for providing preselected value "weights" to items and to database transaction records when generating association rules to identify sets of items and transactions having different levels of user importance.

BACKGROUND OF THE INVENTION

In recent years, commercial businesses have been increasing the use of information-driven marketing processes, managed by database technology, to develop and implement customized marketing strategies and programs. The progress of information automation has increased the size of commercial computer databases to the point where enormous amounts of commercial numbers, facts and statistics are collected and stored; unfortunately less information of any significance is being extracted from such databases because their size has become less and less manageable. The problem is that conventional computer databases are efficient in the manner in which they store data, but inefficient in the manner of searching through data to extract useful information. Simply stated, the use of computers in business and network applications has generated data at a rate that has far outstripped the ability to process and analyze it effectively.

Data "mining" or knowledge discovery in databases, has been growing in response to this problem because computer systems cannot efficiently and accurately undertake the intuitive and judgmental interpretation of data. Computer systems can, however, undertake the quantitative aspects of data mining because they can quickly and accurately perform certain tasks that demand too much time or concentration from humans. Data mining systems are ideally suited to the time-consuming and tedious task of breaking down vast amounts of data to expose categories and relationships within the data. These relationships can then be intuitively analyzed by human experts.

Data mining systems identify and extract important information from patterns or relationships contained in available databases by sifting through immense collections of data such as marketing, customer sales, production, financial and experimental data to "see" meaningful patterns or regularities and identify what is worth noting and what is not. For example, credit card companies, telephone companies and insurers are mining their enormous collections of data for subtle patterns within thousands of customer transactions to identify risky customers or even fraudulent transactions as they are occurring. Data mining is also being used to analyze the voluminous number of alarms that occur in telecommunications and networking alarm data. Progress in bar code technology use at retail organizations, such as supermarkets, has resulted in millions of electronic records which, when mined, can show purchasing relationships among the various items shoppers buy. Analysis of large amounts of supermarket basket data (the items purchased by an individual shopper) can show how often items are purchased together, such as, for example, milk, bread and butter. The results can be useful for decisions concerning inventory levels, product promotions, pricing, store layout or other factors that might be adjusted to changing business conditions.

Consider data mining of supermarket basket data. In such a situation, the supermarket contains a set of items (its products), of which each shopper transaction or purchase is a subset. In analyzing the volumes of subsets, it is desirable to find the transactions in which the presence of various items occurs a significant percentage of times. The fraction of transactions that a particular set of items (also referred to as an "itemset") occurs in, is known as the support of an itemset. An itemset is called large if its support exceeds a preselected threshold. All other combinations are known as small itemsets. The fraction of transactions containing one itemset I, that also contain another specific itemset J is known as the confidence. For example, in a market basket analysis of shopper transactions, if 60% of the transactions that contain milk also contain bread, and 15% of all transactions contain both of these items, then 15% is the support and 60% is the confidence.

The objective of data mining systems is to uncover relationships or associations between the presence of various itemsets in transactions based on support and confidence factors (called "association rules"). The end result of a data mining operation is the generation of association rules that satisfy user-specified minimum support and confidence constraints for itemsets. These rules are formulated probability rules that are indicative of the frequency association between different items uncovered in the multitude of records.

One of the better known methods for finding large itemsets is the Apriori method described in the publication, *Fast Algorithms of Mining Association Rules*, by R. Agrawal and R. Srikant—Proceedings of the $20^{th}$ VLDB Conference; Santiago, Chile, 1994. To discover large itemsets, the Apriori method makes multiple passes over the transaction records and counts the support of individual items to determine which of them are large, i.e., have minimum support and which of them are small. In each subsequent pass, this method starts with a seed set of itemsets found to be large in the previous pass. This seed set is used for generating new potentially large itemsets, called "candidate" itemsets, and the actual support for these candidate itemsets are counted during the pass over the data. At the end of the pass over the transactions, the candidate itemsets that are actually large are identified, and they become the seed for the next pass.

A fundamental premise of the Apriori method is that any subset of a large itemset must also be large. Therefore, candidate large itemsets can be generated by joining itemsets already found to be large, and eliminating those large candidate itemsets that contain a subset which has not been found to be large. This process continues, pass after pass over the data, until no new large itemsets are found. Association rules are constructed for itemsets which exceed the confidence threshold from the large itemsets uncovered.

One shortcoming of the Apriori method is that as the size of the database increases, the number of items searched increases, as does the number of association rules that are generated. In very large databases, the user is left a large amount of quantitative association information. However, in practice users are often interested in only a subset of associations, for instance, those containing items from a subset of items that have very different levels of importance. In the market basket example, some items like caviar or lobster are of much higher value than items such as candy. Association rules involving {lobster, caviar} will have less support than those involving candy, but are much more significant in terms of profits earned by the store. Under the Apriori method, the itemset {lobster, caviar} is of low support and will not be included in the association rules that are uncovered.

A more recent data mining technique that attempts to avoid some of the limitations of the Apriori method is that disclosed by H. Toivonen in the paper, *Sampling Large Databases for Association Rules,* H. Toivonen, Proceedings of the 22$^{nd}$ VLDB Conference, Bombay, India, 1996. Toivonen presents a database mining method which randomly picks a sample record from the database, uses it to determine the relationship or pattern on the assumption that it probably holds for the entire database, and then verifies the results with the rest of the database.

The method uses the random sample and makes a series of passes over the data to determine which items are frequently found. Each pass builds on the previous collection of frequently found items until the method finds a superset from the collection of frequently found subsets. This approach attempts only one full pass over the database, and two passes in the worst case. In order to increase accuracy, the method is fairly conservative in its estimation, so it must count many more itemsets than are actually required in one pass.

This method uses a random sample of the relation to find approximate associations, and applies those results to the entire database. The significant shortcoming of the Toivonen method, however, is that it also results in a large volume of association rules that militates accurate interpretation, and lacks the ability for user-defined value attributes for the itemsets.

In most problem domains, it does not make sense to assign equal importance to all of the items involved in the data mining analysis. Understandably, existing methods for generating association rules in practical data mining applications suffer from two basic drawbacks: (i) the volume of results is typically very large and it is hard for the user to draw conclusions from the numerous association rules which are produced, and (ii) certain results, produced from itemsets in which the individual items or transactions have very different levels of importance, are not included.

Because of the shortcomings of the current data mining techniques, what is needed is a method and apparatus of accurately finding large itemsets while providing the user the ability to assign distinct values or attributes to different items or transactions in the database, and thereby provide more qualitative association rules.

Accordingly, it is an object of the present invention to provide a data mining method and apparatus that provides preselected value weights to items and/or transactions to generate association rules that meter user-defined thresholds of importance.

It is still another object of the present invention to accomplish the above-stated object by utilizing a data mining method and apparatus which is simple in design and use, and efficient to perform with regard to database activity.

The foregoing objects and advantages of the invention are illustrative of those that can be achieved by the present invention and are not intended to be exhaustive or limiting of the possible advantages which can be realized. Thus, these and other objects and advantages of the invention will be apparent from the description herein or can be learned from practicing the invention, both as embodied therein or as modified in view of any variation which may be apparent to those skilled in the art. Accordingly, the present invention resides in the novel methods, arrangements, combinations and improvements herein shown and described.

SUMMARY OF THE INVENTION

In accordance with these and other objects of the invention, a brief summary of the present invention is presented. Some simplifications and omissions may be made in the following summary, which is intended to highlight and introduce some aspects of the present invention, but not to limit its scope. Detailed descriptions of a preferred exemplary embodiment adequate to allow those of ordinary skill in the art to make and use the inventive concepts will follow in later sections.

According to a broad aspect of the invention, a method is disclosed for searching a collection of data records to detect records having sets of items (itemsets) and/or selected transactions to form association rules corresponding to the itemsets detected based on weighted values assigned to the items and transactions, the method including the steps of (i)reading data records in a seriatim manner; (ii)assigning the weights to items and transactions; (iii)incrementing a separate weight counter for each itemset and for each selected transaction detected in a record; (iv)comparing the weighted support of an itemset and a selected transaction to a preselected support threshold; (v)generating new supersets from itemsets having a weighted support greater than the preselected support threshold; (vi)reading the records identified as containing itemsets with a weighted support greater than the preselected support threshold; (vii)incrementing a separate weight counter for each superset detected in a record; and (viii)comparing the weighted support of each superset to the preselected support threshold. The foregoing steps of counting the weighted itemsets and generating candidate supersets which are then checked for a weighted support threshold is repeated until every itemset has been counted. Once the database records have been traversed, association rules are created from the itemsets counted. The generated association rules meet user-defined thresholds of importance, and are not simply based on the quantitative aspects of the itemsets found.

In order to insure that important itemsets are identified even though a subset might not be counted, the present invention advantageously counts and temporarily stores small itemsets from which large itemsets may later be derived. The present invention uses several methods to determine which itemsets should be temporarily counted and stored for later retrieval. These include a "conservative" method, an "aggressive" method, and a "hybrid" method that basically combines the conservative and aggressive methods. In these methods, the weighted support is scaled to relax the requirements for determining if an itemset is large so that its weighted superset can be uncovered.

According to another broad aspect of the invention, a programmable general purpose computer apparatus is disclosed for searching a file of records collectively stored in an electronic database. The search identifies itemsets among the records based on weighted values assigned to the items and/or selected records. The apparatus includes a processor for performing decision making, control operations and data manipulation; an array of memory storage having address inputs and data inputs and outputs for storing the records within the memory storage during the search; an address generation unit having address outputs coupled to the address inputs of the memory storage, for generating addresses to access different locations within the memory storage; and an interface unit having address inputs connected to the address outputs of the address generation unit.

DETAILED DESCRIPTION OF THE PREFERRED EMBODIMENTS OF THE INVENTION

The present invention contemplates a data mining method and apparatus that assigns weight values to items and/or transactions based on the value to the user, thereby resulting in association rules of greater importance. A conservative method, aggressive method, or a combination of the two can be used when generating supersets, depending on the acceptable performance tradeoff.

Figure 1:
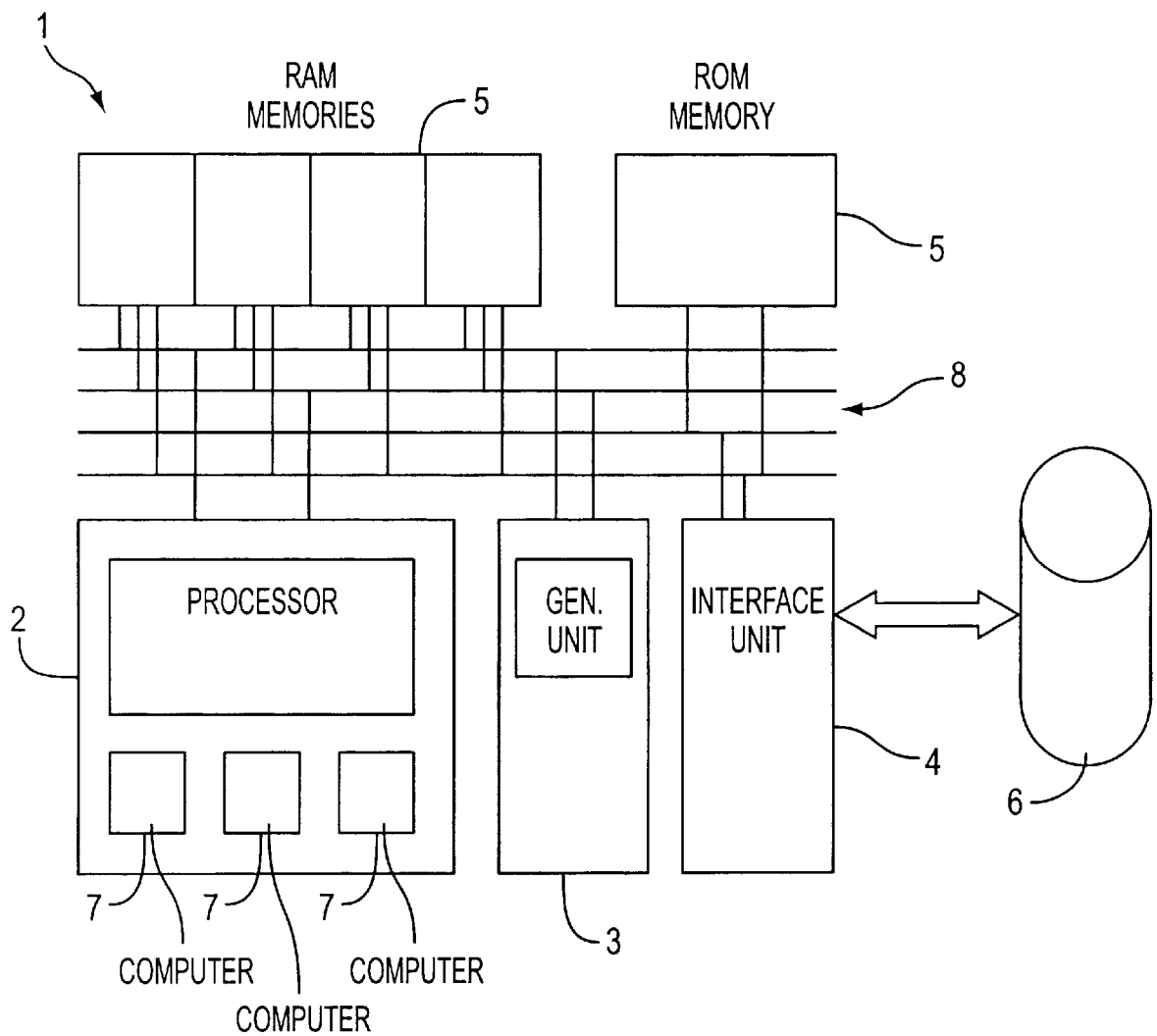
FIG. 1 is a block form diagram of an implementation of the dynamic itemset counting system on a general purpose computer.

Referring now to the drawings, in which like numerals refer to like components or steps, there is disclosed in FIG. 1 broad aspects of a preferred embodiment of the present invention. FIG. 1 discloses a general arrangement of a data mining system, referred to herein as a Weighted Itemset Support ("WIS") system 1, for assigning different "weight" values, or degrees of importance, to items and/or transactions in order to provide weighted support to the association rules that are generated during data mining operations.

In a preferred embodiment of the present invention, the WIS system 1 works in conjunction with a general purpose computer or similar processor based electronic device for processing large buffers of data by quickly executing repetitive operations. However, it should be understood that the references to specific components typically found in general purpose computers, related to but not forming part of the invention, are provided for illustrative purposes only. References to such computer components are provided for ease in understanding how the present invention may be practiced in conjunction with known types of data processing applications. Moreover, the various components of the WIS system 1 contemplated by the present invention may be implemented by direct electrical connection through customized integrated circuits, programming or a combination of circuitry and programming, using any of the methods known in the industry for providing the functions described herein without departing from the teachings of the invention. Those skilled in the art will appreciate that from the disclosure of the invention provided herein, commercial semiconductor integrated circuit technology would suggest numerous alternatives for actual implementation of the functions of the WIS 1 that would still be within the scope of the present invention.

According to one embodiment of the present invention, the WIS 1 contains, in pertinent part, a processor unit 2 (preferably a microprocessor), an address generation unit 3, and an interface unit 4. The WIS 1 also contains data storage memory arrays 5 which may be composed of read only memory (ROM) and random access memory (RAM) storage locations, and preferably a combination of both. The processor 2, address generation unit 3, interface unit 4 and the memory arrays 5 are all interconnected via a suitable communication bus 8 as is practiced in the industry. The memory arrays 5 have address inputs and data inputs and outputs for storing and retrieving data from different storage locations within the arrays 5. The address generation unit 3 has address outputs coupled to the address inputs of the memory array 5 and to address inputs of the interface unit 4. The interface unit 4 also has address outputs connected to address inputs of external mass storage units 6.

The processor 2 provides decision making and control operations, and further includes a plurality of registers 7, composed of both general purpose storage registers and specific purpose registers such as accumulators, counters and pointers. As practiced in the industry, the processor 2 communicates through the interface unit 4 to external mass to storage units 6 such as disk drive units. Similar to the memory 5, the disk drive units 6 include data inputs, data outputs, and address inputs so that data can be read from or written to the disk drives 6. It is anticipated that the database (over which the WIS system 1 will operate) will be maintained on the disk drives 6, with portions of the database being copied into the memory arrays 5 so that the processor 2 can manipulate the data.

Figure 2:
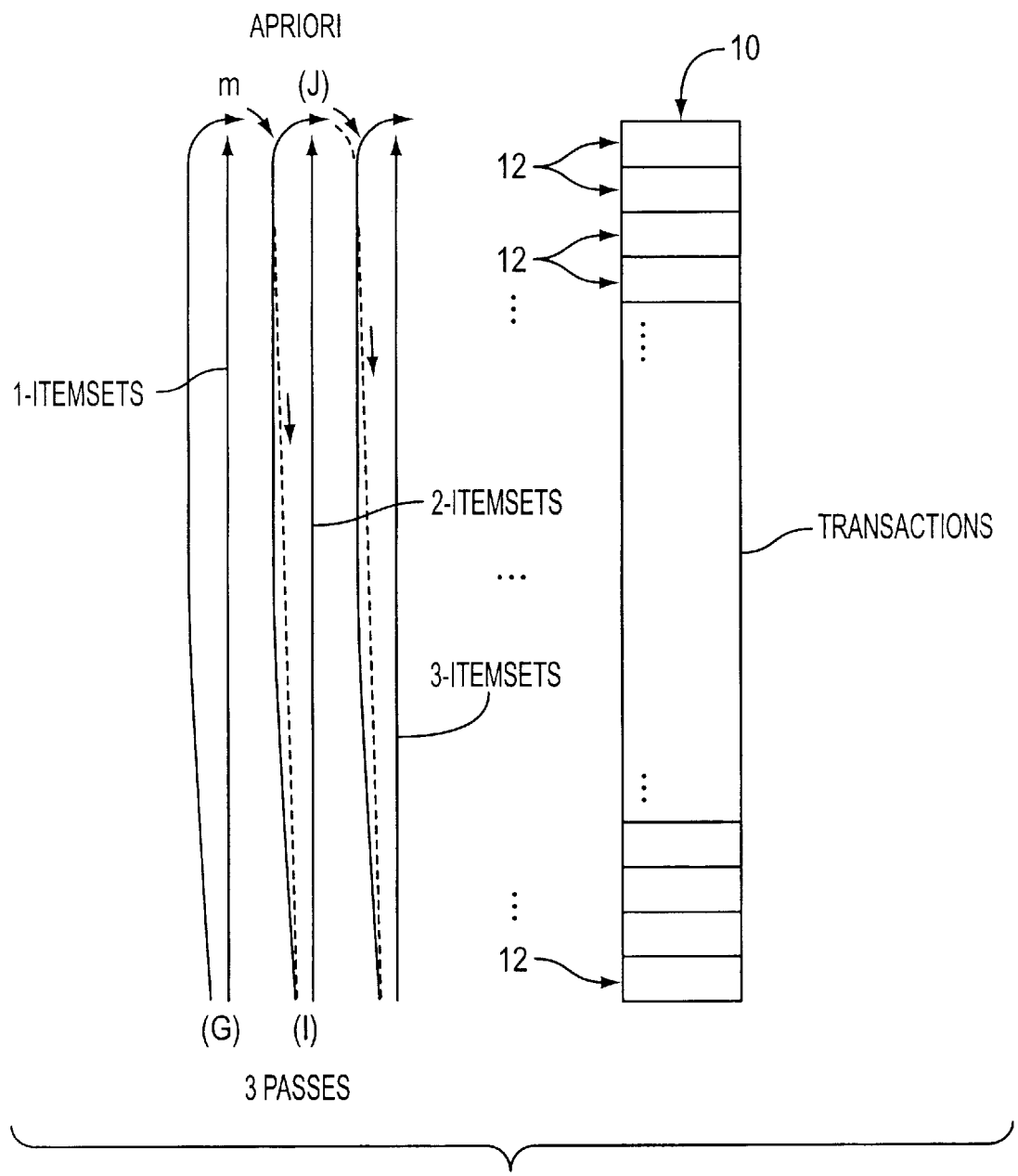
FIG. 2 is a diagram of an Apriori prior art data mining arrangement.

Turning briefly to FIG. 2 for background purposes, there is shown an electronic database D or set of data transactions 10 containing a sequential plurality of files or records 12 that represent individual transactions. The prior art Apriori method of data mining shown therein begins with the counting of recognized 1-itemsets (sets having one item; e.g., in the supermarket basket case the one item would be the transactions having a milk purchase) at the start of the transactions (g). The process continues until every record 12 is traversed, culminating at the end (h) of the data transactions 10. After a first pass over the data transactions 10, the process starts sifting through the records 12 for 2-itemsets (itemsets containing two items, such as, for example, milk and cookies). The process starts at the beginning of the transaction records 12 having 1-itemsets (i) and continues through the records 12 until it reaches the end (j) of the data transactions 10. The same process of restarting from the beginning of the data transactions 10 for generating a new itemset and counting it is repeated for 3-itemsets, and so on. All items and records 12 are considered to be of equal value, and this method, which generates a large volume of results that includes a lot of unimportant association rules, lacks the ability to vary the significance of certain items or transactions based on their importance to the user.

Conversely, in a preferred embodiment of the present invention, the WIS system 1 utilizes user defined values or "weights" for items and/or records 12 to bias the generated association rules so that rules that apply to itemsets of high importance to the user are more likely to be uncovered. Generally, a plurality of user selected weights, for example, the respective profits made by selling one unit of certain items, are stored in registers 7 or in designated addresses of memory 5, as positive, real numbers. The processor 2 can assign the real number weight w to certain items i reflecting the "significance" of those items relative to other items.

According to the present invention, user selected weights may also be assigned to transactions in order to determine pattern regularities of, for example, frequent types of customers. In the supermarket basket situation, a user may select the profit made by the store on the total transaction, or some value that corresponds to the significance of the customer, as a transaction weight. Different values may be assigned to transactions of, for example, frequent customers, big spending customers, etc. Assigning a transaction weight to a health care patient stay would, for example, result in the generation of association rules that could identify a small number of patients with large costs or, alternatively, a large number of patients with small costs.

As mentioned above, data mining operations rely on the support and confidence of association rules as generated to identify significant patterns. Association rules are produced in the form of A and B→D and E, indicating that items A and B occurring together in a record 12 usually implies that items D and E are also present in that record 12. In the present invention, the user can specify a weighted support threshold ("W") for association rules such as A and B→D and E to uncover those itemsets and/or transactions which exceed a predetermined value, such as an overall profit measure. For example, a user may be interested in the profit due to the joint sale of the items by which a store generates a total profit of at least $25.

For weighted items only, to determine if an itemset (J) meets or exceeds the weighted support threshold W, the WIS 1 must first determine the weighted support of the itemset ("$w_s$") for comparison purposes. The weighted support of an itemset generated by the WIS 1, in the example given above, would be the fraction or ratio of the weight of the records 12 that contain the itemset {A, B, D, E} to the cumulative weight of all of the items in all of the records 12 contained in data transactions 10. According to the present invention, the weighted support ($w_s$) for an itemset J={$J_1, \ldots J_k$}, is computed by processor 2 as:

$$w_s(J)=\Sigma_{t \in T, J \subseteq t} w(t)*(\Sigma_{j \in j}(w(j)+k)),$$

where k is a constant. The normalized weighted support ("$w_{ns}$") is basically the weighted support $w_s(J)$ divided by the sum of the weights found in all records 12, and is computed as:

$$w_{ns}(J)=w_s(J)/(\Sigma_{t \in T} w(t)*(\Sigma_{j \in t}(w(j)+k))),$$

where j ranges over each item contained in a record 12 (or transaction t). T is defined as a set of t transactions.

When a user selects to utilize certain values or weights only for items, the processor 2 sets k to a zero value. This allows the WIS 1 to indirectly set variable size frequency levels for the different itemsets that are uncovered. As can be understood, itemsets with a larger number of items will appear less frequently, and vice versa. For example, if all item weights are set to 1 by the processor 2, the frequency of a given itemset being uncovered will be inversely proportional to the number of items contained in the itemset.

In the case when preselected values or weights are assigned only to transactions (i.e., records 12), transaction constant k is set to a non zero value (the weights for items are set to zero by the processor 2). This allows the WIS 1 to set non-uniform values to different transactions, for example to uncover the itemset patterns of particular customers. Such customers may be identified for computational purposes by the number of times the customer has shopped at a particular store, as compared to the number of times other customers have shopped in the store, by the profit generated by the customer or by relative transaction purchases.

Figure 3:
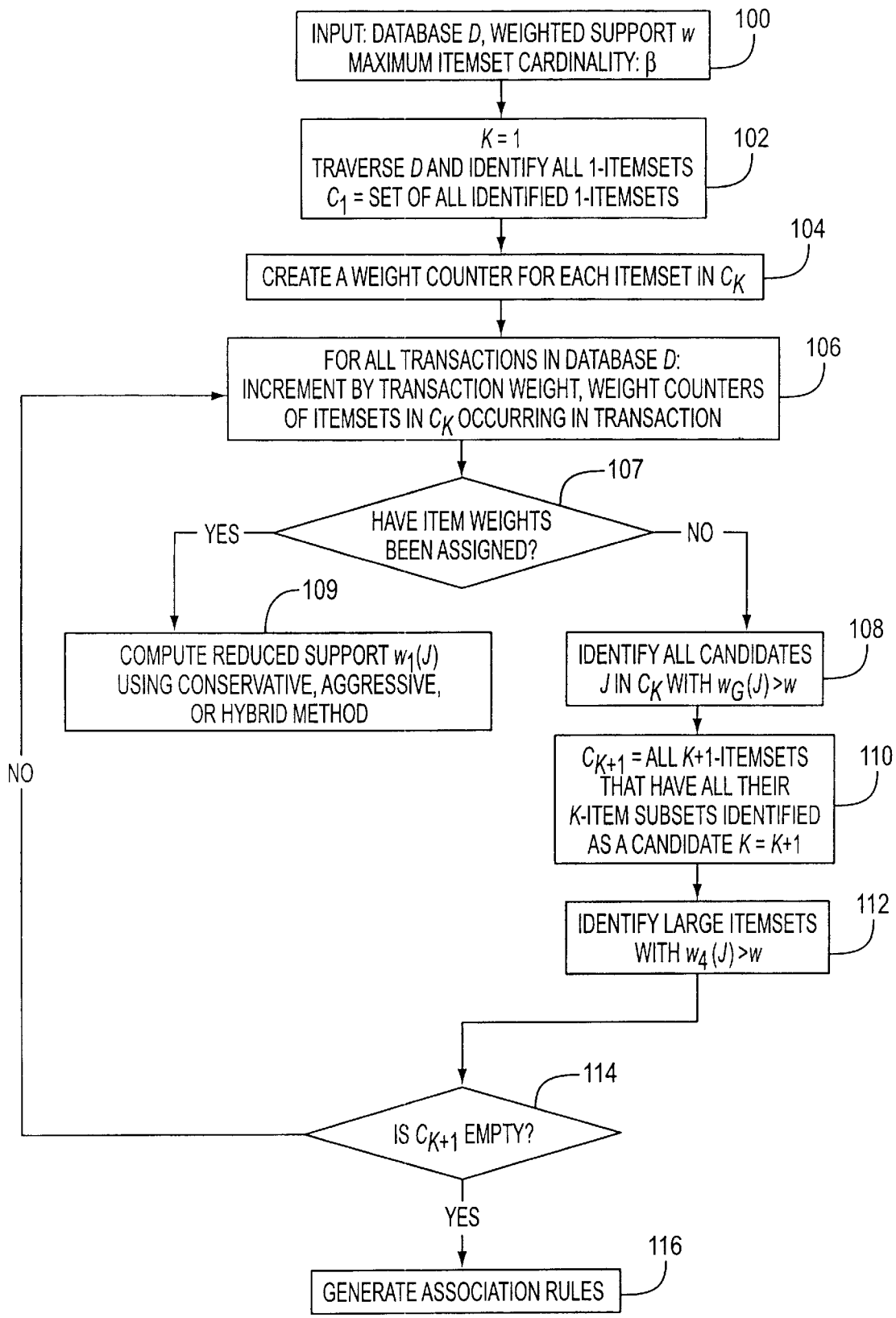
FIG. 3 is a diagram of a general implementation of the weighted itemset support system of the present invention.

Referring now to FIG. 3, the operation of one embodiment of the WIS 1, over a database D or set of data transactions 10, is generally disclosed. Starting with Step 100 at the top of FIG. 3, the processor 2 resets all pointers, registers 7 and dedicated areas of memory 5 that will be used to store the weighted support threshold w and, inter alia, portions of database D (normally residing on external mass storage units 6) having individual records 12. Also in Step 100, a register 7 may be initialized for storing a maximum itemset cardinality parameter β. The cardinality parameter β represents an optional user-defined limit on the size of the itemsets to be counted (e.g., β equal to 5 would set the process to cease after counting all 5-itemsets).

For items i identified as {$i_1, i_2, \ldots, i_n$} in the data transactions 10 (representing, for example, the products sold by the supermarket), each distinct item i can be assigned the real number weight by the processor 2 prior to itemset counting or during an itemset counting in a pass over the database records 10. In one embodiment of the present invention, it is preferable that the items $i_1, \ldots, i_n$ are assigned the respective weights, are sorted by the assigned weight in the order of maximum to minimum weights and are then stored in a designated array of memory 5 prior to itemset counting.

In Step 102, a special purpose register 7 is initialized and used as a fast counter k, starting with k set to one for the first pass over the database D. The processor 2 makes a pass over the database records 12 to count all 1-item itemsets. The prior art Apriori method may be employed for this purpose, or other techniques such as the Dynamic Itemset Counting system of data mining described in U.S. patent application Ser. No. 08/853,757 and incorporated by reference herein, may be employed. In a preferred embodiment of the present invention, the Dynamic Itemset Counting system is used. The salient functions of the Dynamic Itemset Counting system are described below, however, it should be understood that the present invention is not limited to any specific itemset counting technique.

When each record 12 is read, the WIS 1 will classify the itemset that is detected into one of four classes: (i) suspected large, (ii) suspected small, (iii) confirmed large, or (iv) confirmed small. Suspected "large" or "small" itemsets are those which are still being counted, and confirmed itemsets are designated as such when all of the records 12 are read and the itemsets are counted. When the processor 2 reads, for example, the first record 12 of the data transaction 10, it classifies the record 12 as "suspected small" if the record 12 meets the criteria for the 1-itemsets (and "confirmed large" if the record 12 is empty).

Separate counters or registers 7 are used to keep track of the number of records 12 designated in each of the four classifications. These counters may be special purpose registers 7 to monitor and keep track of each itemset and its classification count, or they may be a designated area of memory 5 provided specifically for the purpose of maintaining itemset data. In a preferred embodiment of the present invention, special purpose registers 7 are used as fast counters. As each record 12 is read, the appropriate counter and classification registers 7 are incremented. Once a suspected small itemset has a count that exceeds the predetermined support threshold, the itemset becomes classified as suspected large.

When the processor 2 has traversed all of the records 12 for each particular itemset (which includes all records 12 within a complete loop of data transactions 10), its suspected large or suspected small classification becomes a confirmed large or confirmed small classification, whichever the case may be. The set of all identified 1-item itemsets, $C_1$, is then stored in a specific register 7, or optionally, in a dedicated area in memory arrays 5. In a preferred embodiment of the present invention, the processor 2 uses dedicated registers 7 as counters for each large itemset C that is uncovered in the pass over database D.

If not performed for all items i in the set of items $\{i_1, \ldots, i_n\}$ at the beginning of the operation (in Step 100), then each item i in the identified large itemsets is assigned a preselected weight value during the 1-itemset counting in the first traverse over database D. The items $i_1, \ldots, i_n$ are then sorted by the assigned weights in maximum to minimum weight order before being stored in registers 7 or memory 5.

The first pass over database D simply counts the number of occurrences of each item to determine the large 1-itemsets, and assigns weights to the items and transactions, as the case may be. The large itemsets C from the first pass are used to generate candidate itemsets $C_k$. Using registers 7, a weight counter is created for each itemset in $C_k$ (Step 104). In the next pass, the support of candidates in $C_k$ is counted, as described below. To efficiently determine the candidates in $C_k$ that are contained in a given record 12, a hash tree data structure is employed by the present invention for storing and retrieving data based on a transformation that takes a variable sized input and returns a fixed size bit string (representing data).

Figure 4:
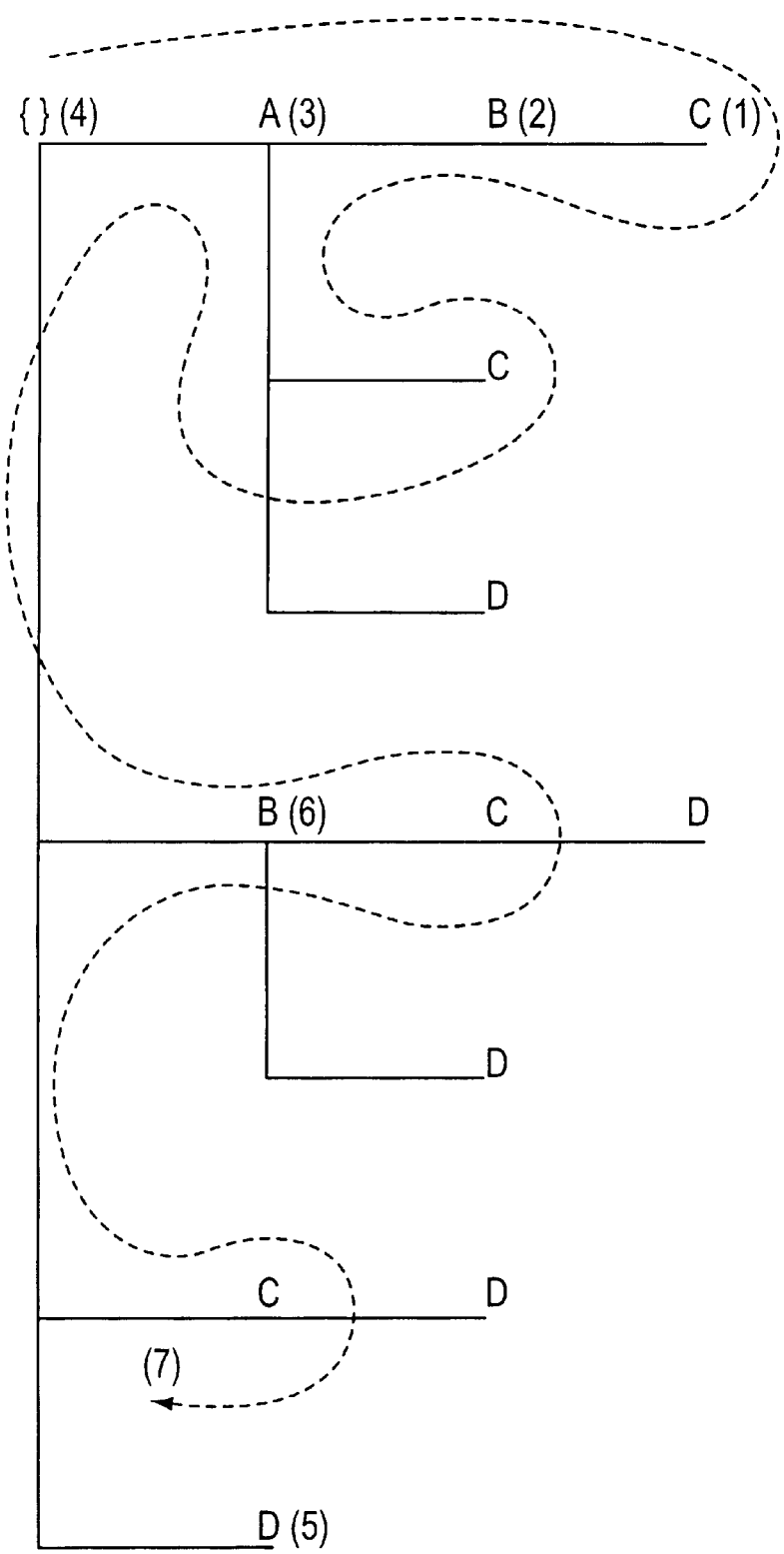
FIG. 4 is a perspective diagram of a hash tree arrangement for serial processing in one embodiment of the present invention.

Turning briefly to FIG. 4, an exemplary hash tree structure for generating candidate itemsets $C_k$ is shown. Here, the items A, B, C, D are used for illustrative purposes. The processor 2 is concerned with recognizing the itemsets containing exemplary items A, B, C and D. An empty itemset is represented at the root node (4) by the { } symbol. Each itemset is represented by the path from the root node (4) to the respective node. As can be seen, all itemsets (A, B, C and D) are connected to the root node (4). Itemsets having elements ABC, for example, are represented by the path from the root node (4) to node (1), and itemsets having elements AB are represented by the path to node (2). Each of the itemsets which are being counted or have been counted has a path to a specific node associated with it, as do all of its prefixes. Branches represent the subsets (such as BC at node (6), and D at node (5)).

The dotted line (7) shown in FIG. 4 represents the path through the data tree for an exemplary itemset ABC. The nodes to the left of the path correspond to the registers 7 that must be incremented by the processor 2 during each pass over the records 12. For an itemset of elements ABC, the registers 7 A, AB, ABC, AC, B, BC and C are incremented in this order.

As stated above, after transaction records 12 are read during a pass over the database D, support threshold levels are compared to the itemset count in the register 7, and based upon the count, each node of the hash tree is identified as large or small. From there, the next suspected large itemset (2-itemset, 3-itemset, etc.) is generated, including its supersets. New suspected itemsets (small, large) may also be generated in advance by targeting specific items for detection. It may be desirable to search for specific 2-itemsets based on known 1-itemsets. For example, the producer of children's cereals may be looking for the association between sales of cereals and cookies (in the 2-itemset). In such a case, the itemsets to be generated for each pass may be programmed or selected in advance.

It is more likely (and preferable) that the WIS 1 itself generate the new suspected itemsets based on the counts of items uncovered in previous passes over the records 12 so that unknown regularities may be uncovered. In addition, the WIS 1 can generate supersets from itemsets that share at least one item. A 2-itemset containing items A and B and a 2-itemset containing items A and C can be combined into a superset of items A, B and C. The itemsets (AB, AC) that make up a superset when combined are, of course, subsets of the superset (ABC). Additional registers 7 are provided for keeping track of any superset which may have been generated during the search and which has all of its subsets classified as suspected large or confirmed large. Such a superset is initially classified as suspected small until a support threshold for the superset is reached.

Every subset of the superset generated under the Dynamic Itemset Counting System is examined to see if each one is suspected large. If every subset is a suspected large subset, the superset is added as a branch to the hash tree structure of FIG. 4. This process is repeated until the processor 2 has read all records 12 corresponding to all of the suspected large itemsets for each of the suspected large nodes of the hash tree. In the case where one of the subsets of a superset is not suspected large, then that superset is not added to the hash tree.

Returning now to FIG. 3, during the next pass over database D to count itemsets, the processor 2 increments the weight counters in registers 7 of itemsets in $C_k$ occurring in the transactions (Step 106). The registers 7 are incremented by the predefined item weights and/or transaction weights. If item weights have been assigned (Step 107), the weighted support of each itemset $w_s(J)$ as counted is compared to the user selected weighted support threshold w (Step 108).

In Step 110, the next group of suspected large itemsets $C_{k+1}$ is established by processor 2 for all k+1 itemsets, based on itemsets having a weighted support $w_s(J)$ greater than the weight support threshold w. In addition, the register 7 used as a counter for k is incremented by one. In the next pass over the database D, the processor 2 counts candidate itemsets and identifies all large itemsets from the candidate itemsets in $C_{k+1}$ having a weighted support $w_s(J)$ that is greater than the preselected weighted support w, similar to the process in Step 108. The process is repeated over database D until all large itemsets having a weighted support $w_s(J)$ greater than the preselected weighted support w are uncovered (Step 114). With all the large itemsets having a count greater than the weighted support w found, association rules can be derived (Step 116).

The generated association rules are in the following form: if $A_1$ is true and $A_2$ is true and so on until $A_n$ is true then, plausibly, $C_1$ is true and $C_2$ is true and so on until $C_n$ is true. $A_1, A_2, \ldots, A_n$ are the antecedents of the rule and $C_1, C_2, \ldots, C_k$ are the consequences of the rule. For any given itemset we can generate many association rules. Thus, for example, if an itemset contains ABC then, association rules that can be generated include AB→C, A→BC, BC→A, B→AC and AC→B, where "→" denotes "then." For any itemset generated, the WIS 1 will generate association rules related to the probability of individual items appearing as itemsets, for those itemsets having a count greater than the weighted support threshold. Utilization of known filtering methods such as confidence measurement or gauging could serve to reduce the number of association rules, if desired. This generation of association rules from itemsets is a component of the apparatus disclosed by this invention.

In the supermarket basket example, if an itemset ABC corresponds to the items fruit juice, cookies and children's' cereals, then the generated association rule BC→A translates into the finding that customers purchasing cookies and children's' cereals also purchase fruit juice $w_s(J)$ number of times, where $w_s(J)$ is presumably above the predetermined weighted support threshold.

In the embodiment of the present invention in which the user assigns weights to items and/or transactions (Step 107), the WIS 1, advantageously, uncovers itemsets that are large even though some of the subsets are small. This is contrary to a critical operating assumption used in the prior art Apriori method, namely that if an itemset is large, then all of its subsets are large. As discussed above, the Apriori method builds large itemsets of increasing size by adding items to itemsets that are already discovered to be large. In the present invention however, an itemset may be determined as large even if one of its subsets is small. This is because the weight of an item not present in a transaction can greatly increase the weighted support of the itemset in the superset. For example, the weighted support of the itemset {A, B} may be small, but its superset {A, B, C} may be large because of the weighted value assigned to the C item.

In order to insure that the itemset {A, B, C} is identified even though a small subset {A, B} would normally not be counted, the present invention advantageously counts and then stores small itemsets in temporary registers 7 and/or areas of memory 5 from which large itemsets may later be derived. The present invention uses several strategies to determine which itemsets should be temporarily counted and stored for later retrieval. These include a "conservative" method, an "aggressive" method, and a "hybrid" method that basically combines the conservative and aggressive methods (Step 109).

Figure 5:
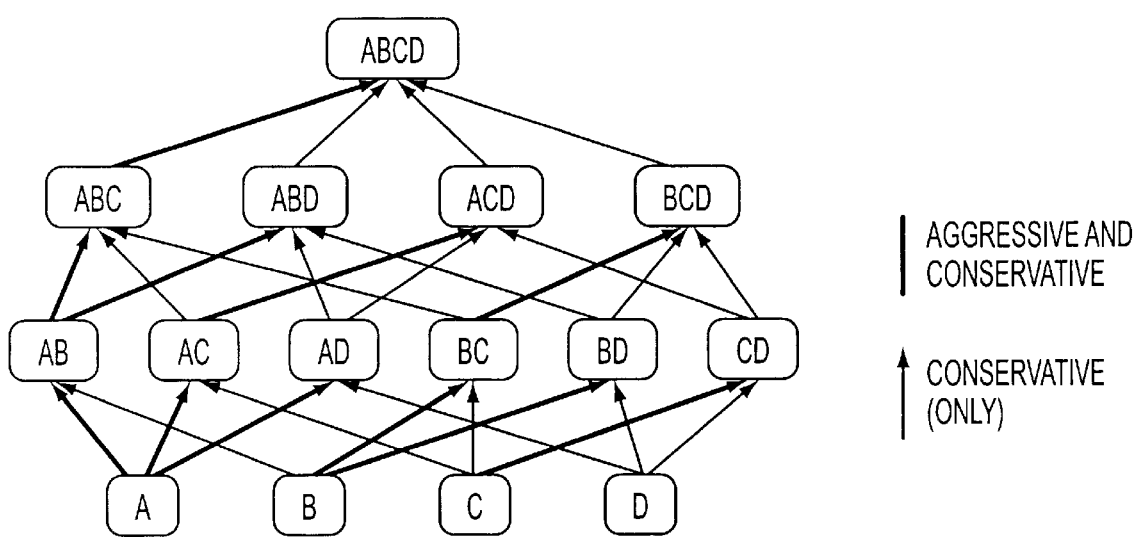
FIG. 5 is a perspective diagram of a hash tree arrangement for a conservative and aggressive processing in one embodiment of the present invention.

Referring now to FIG. 5, a general description of candidate itemset determinations for a conservative discovery method and for an aggressive discovery method will be described. Starting at the bottom of FIG. 5, the first level exemplary 1-item itemsets A, B, C and D are shown. At the next level up, 2-itemset candidates are shown; above that, 3-itemset candidates are shown, and so on. To insure that the necessary superset candidates (i.e., 2-itemsets, 3-itemsets, etc.) are identified, the count of subsets are compared against lower or reduced weighted support thresholds instead of the user defined weighted support threshold w. This reduced weighted support threshold, $W_r(J)$, is obtained by scaling w with a scaling ratio $\phi(J)$. The scaling factor is applied to the weighted support w via direct multiplication to produce the reduced support threshold $W_r(J)$. That is:

$$W_r(J) = \phi(J) * W$$

The scaling factor $\phi(J)$ is generated by the processor 2 based on the user specified cardinality parameter $\beta$ (see Step 100 in FIG. 3). As mentioned above, $\beta$ represents the largest number of items in the itemset size that the user is interested in (e.g., 5-itemset). For an itemset J, the derived superset J' that has the maximum itemset weighted support with allowable maximum cardinality $\beta$ is:

$$J' = j_1, j_2, \ldots, j_k, i_{n-\beta+k+1}, i_{n-\beta+k+2}, \ldots, i_n$$

(Note that the set of items are sorted by weight in the order $i_1 \ldots i_n$, with $i_1$ having the maximum weight).

The worst-case possibility when determining whether or not to count itemset J is the eventuality that every record 12 which contains J also contains superset J', and that superset J' is large because it has a high itemset weight. In this case, J' will exceed the weighted support threshold w if itemset J exceeds the weighted support threshold. The scaling factor $\phi(J)$ is computed by processor 2 as the ratio of the total weight of items of J to that of J', the ratio by which the weighted support of J' is greater than that of J in the worst case (that is, if the set of transactions in which J' is present is the same as those in which J is present). Hence, $\phi(J)$ can be calculated based on the item weights of J and the rest of the items as:

$$\phi(J) = \frac{\sum_{i=1\ldots k} w(j_i)}{\sum_{i=1\ldots k} w(j_{ii}) + \sum_{i=n-\beta+k+1\ldots n} w(j_i)}$$

The scaling ratio $\phi(J)$ is generated such that for any superset which has enough weighted support its subsets are counted and temporarily stored, even if a subset is below the weighted support threshold and would not have been stored as it was being counted. In other words, the scaling factor $\phi(J)$ is used to "relax" the restriction on the weighted support threshold of an itemset J so that if any of its derived supersets is large, then itemset J is counted and stored temporarily for later retrieval.

Using the scaling factor $\phi(J)$, the processor 2 looks ahead to itemsets of cardinality $\beta$ or less. The scaling factor $\phi(J)$ reduces the number of itemsets of small cardinality that exceed the reduced weighted support threshold $W_r(J)$. Therefore, the number of itemsets that are counted by processor 2 is reduced.

For the aggressive method, diagrammed by the bold lines connecting itemsets with supersets in FIG. 5, the processor 2 looks ahead to the candidate supersets having subsets in which the items are in a seriatim order from highest to lowest weight (along the bold line paths only). In FIG. 5, the weight of itemset A is of higher value than itemset B, which is higher than itemset C; itemset ABC is of higher value than itemset ABD, and so on. Accordingly, when checking whether itemsets should be counted, the aggressive method looks ahead at candidate superset J, and checks for subsets of candidate itemset J in which the items are not in a continuous seriatim weight order (e.g., subsets such as ABD, ACD, etc., also referred to as "indirect" subsets). The items in a subset (or itemset) are arranged in a continuous weighted order (from highest to lowest), therefore indirect itemsets will normally be of lower cumulative weight than "direct" itemsets in which the items are in continuous seriatim (e.g., ABC, BCD, etc.). In the aggressive method, only the direct supersets of a given itemset are counted, foregoing the indirect itemsets.

For the conservative method, diagrammed by the normal and the bold lines connecting itemsets with supersets, the processor 2 looks ahead to all supersets of an itemset. All subsets of a superset being considered are counted. The hybrid method combines the conservative with aggressive methods, differentiated by itemset levels. For example, one embodiment of the hybrid method utilizes the conservative method for 1-itemsets and 2-itemsets, and the aggressive method for the remaining itemsets until the $\beta$ itemset level is reached.

Figure 6:
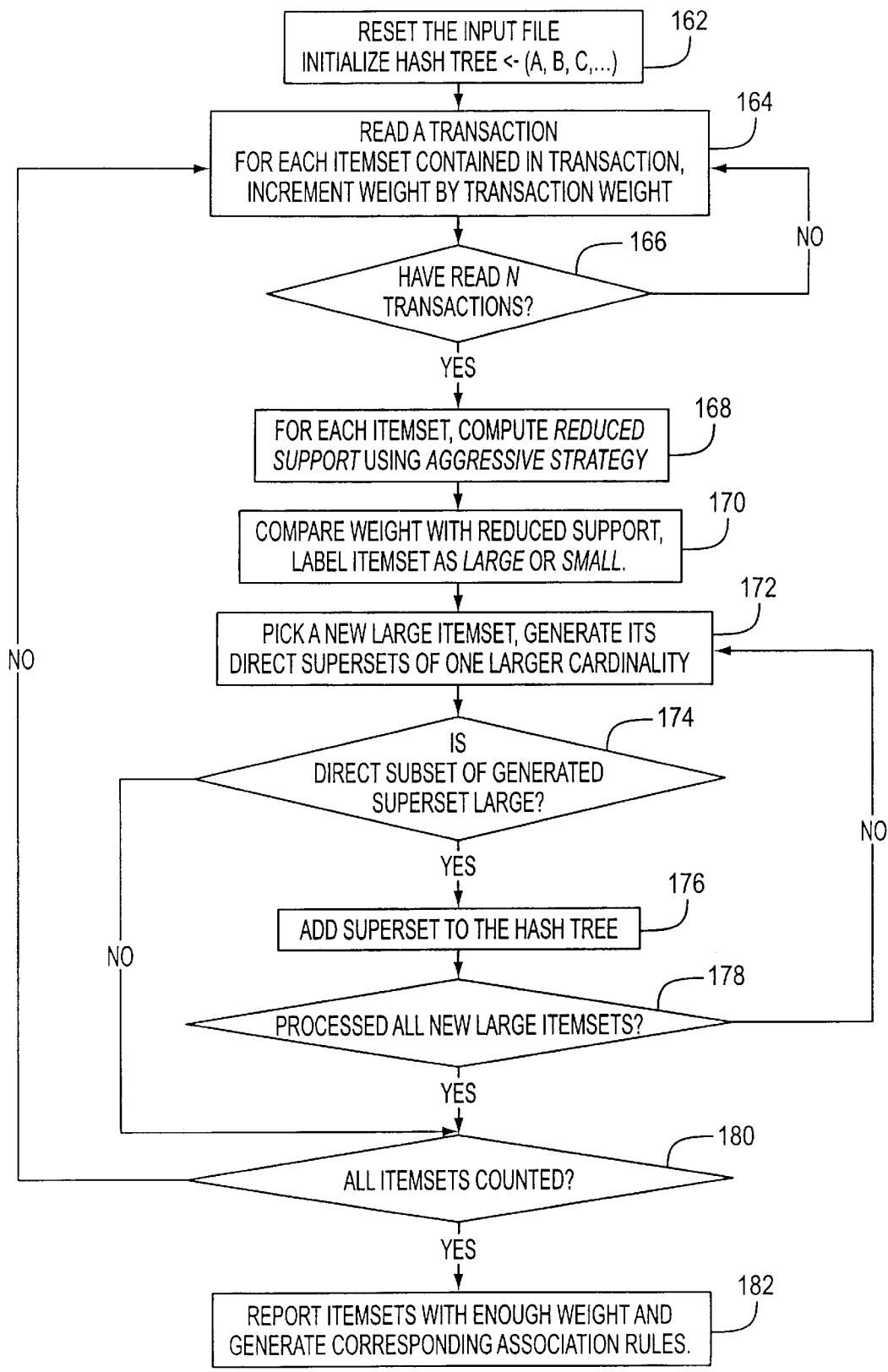
FIG. 6 is a flowchart illustrating the conservative operation of the weighted itemset support system according to another embodiment of the present invention.
Figure 7:
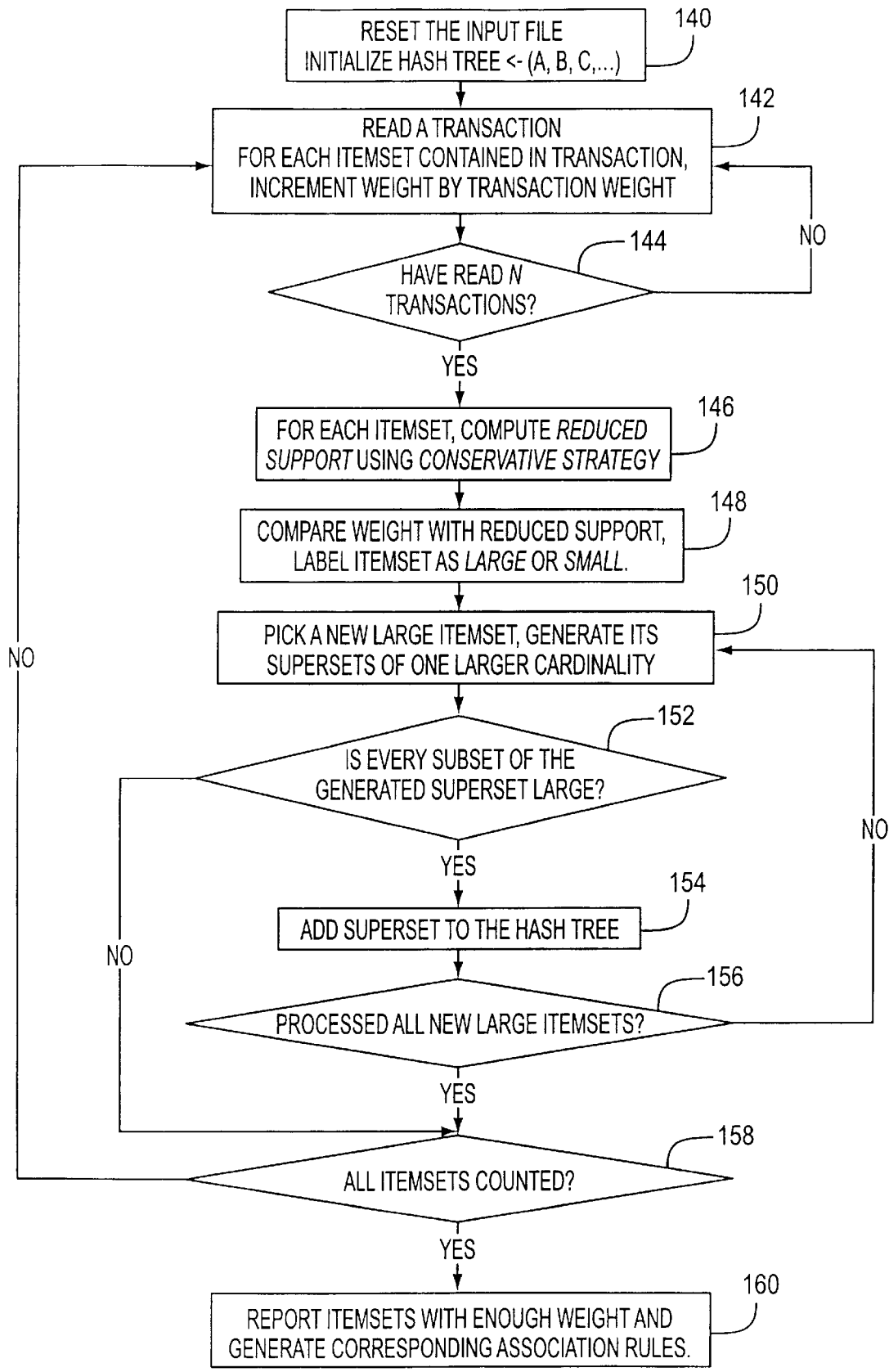
FIG. 7 is a flowchart illustrating the aggressive operation of the weighted itemset support system according to another embodiment of the present invention.
Figure 8:
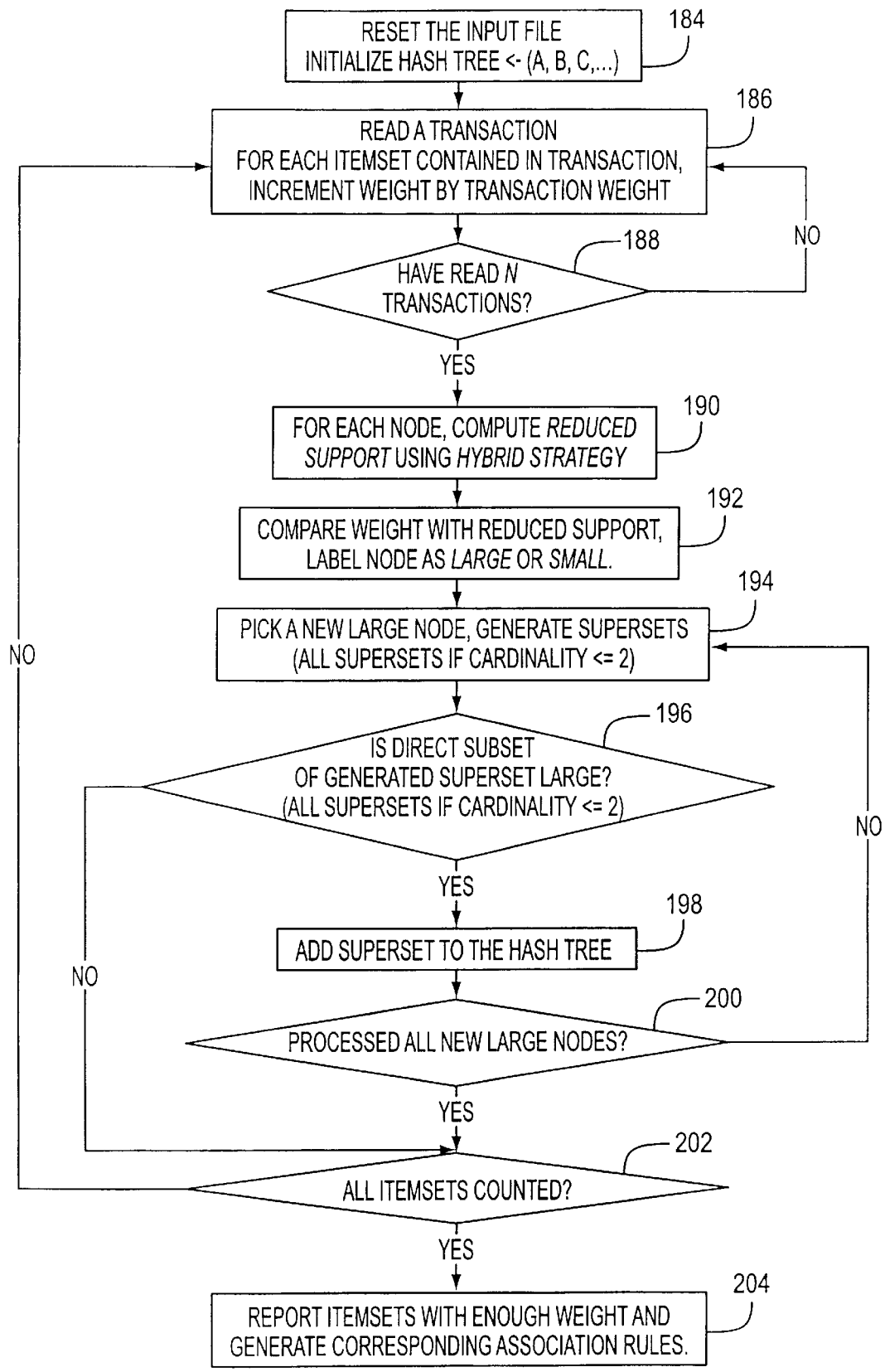
FIG. 8 is a flowchart illustrating a hybrid of the conservative and aggressive operations according to another embodiment of the present invention.

To understand these methods in more detail, flow diagrams of the operation of the conservative method, the aggressive method and the hybrid method are disclosed in FIGS. 6–8. Turning first to FIG. 6, the conservative method is disclosed in detail. For the conservative method in general, the processor 2 sets the reduced weighted support threshold $Wr(J)$ of an itemset J by checking the largest weight subset among all subsets, both direct and indirect.

Beginning at the top of the flow diagram shown in FIG. 6, the processor 2 initializes the hash tree registers 7 (Step 140), and reads the first transaction from a record 12 in a database D or a set of data transactions 10. All items contained in the record 12 are counted by processor 2, and the appropriate registers 7 used as specific itemset counters are updated. Here, the weight of each itemset contained in a transaction is incremented by the user defined weight values. This information is also stored in a special purpose register 7.

In the case where transaction weights are not assigned (i.e., only items are assigned weights), the transaction constant k is set to zero and the transactions themselves remain of a uniform weighted value (Step 142). This process is repeated over database D (or data transactions 10) for N number of transactions. N is a user defined number, which, in the preferred embodiment is set to 10,000 transactions. (Step 144). For each candidate set (a superset represented as a node in the hash tree structure), the reduced weighted support of the itemset is computed by processor 2 using the conservative strategy. This entails computing the reduced weighted support among all subsets, both direct and indirect subsets. (Step 146).

The processor 2 then compares the reduced weighted support with the user selected weighted support of the itemset. If the reduced weighted support exceeds the weighted support threshold, then the itemset is identified as a large itemset. If the reduced weighted support is below the weighted support threshold, the itemset is labeled as a small itemset (Step 148). In the next step, the processor 2 selects a new large candidate set, and checks both direct and indirect subsets thereof (Step 150). If every subset of the generated superset is already a confirmed large itemset (Step 152), then the superset is confirmed as large (and added to the hash tree structure) (Step 154). The remaining large candidate supersets are traversed, and all direct and indirect subsets are checked until all suspected large nodes are processed through Steps 152–154 (Step 156). It should be noted that if the Apriori method is used, all large nodes are confirmed when detected. If any of the generated supersets is not large (Step 152), then that superset is not added to the hash tree structure. The processor 2 continues by reading in the next transaction to count itemsets (reverting to Step 158), until all itemsets of β size or less are traversed (Step 158).

Once the processor 2 uncovers all itemsets in records 12 that are traversed, the processor 2 stores the count of itemsets with weighted values exceeding the weighted support threshold w in a designated area of memory arrays 5. It should be noted that although the resulting itemsets are stored in memory arrays 5 in the preferred embodiment, special purpose registers 7 for faster processing may also be used. From these stored itemset counts, association rules corresponding to the weighted values are generated and output to a user for analysis or stored in memory arrays 5 for future retrieval. (Step 160).

Advantageously, in the foregoing conservative method, all item supersets of a given candidate set are counted by processor 2. This may increase the number of smaller cardinality itemsets that are counted, and not all rules generated may be of equal importance. Additional filtering devices already known to those in the art may be employed to identify those rules that are of value. For example, filtering techniques such as confidence measurement or gauging may be employed in the present invention without departing from its scope.

As for the aggressive strategy, the reduced threshold of itemset J is set by checking the largest weight subset among only the direct subsets having items in a candidate itemset J. Indirect subsets are usually of lower cumulative weight value (since the items in a subset are arranged in weight order from highest to lowest), and are therefore not utilized by the aggressive method. Note that items added to the subset must have weights of a lower value than the items contained in itemset J. Therefore, the processor 2 computes the reduced weighted support by setting the $\phi(J)$ factor as the ratio of weights of the largest weight direct subset to the weight of itemset J.

Attention is now directed to FIG. 7. The implementation of the aggressive method corresponds to that of the flow process shown in FIG. 6 for the conservative method. However, in Step 168, the processor 2 computes the reduced weighted support threshold using the aggressive $\phi(J)$ factor computed in the manner just described, that is using the largest weight of among only direct subsets having items in candidate itemset J when computing $\phi(J)$. The reduced weighted support of the itemset is compared to the user defined weighted support. The itemset is labeled large when the reduced weighted support exceeds the user defined weighted support, and small when it does not (Step 170). In Steps 172 and 174, only direct subsets are checked from the newly generated candidate sets for a large or small classification. Indirect subsets are ignored by processor 2 for the purpose of generating association rules according to the aggressive method.

In this method, only the direct subsets of a given superset have been counted. This may increase the number of larger cardinality itemsets that are counted in some cases. As a specific example, if an itemset J has been generated then all of its direct supersets of the type $J_{i\_1}$ (containing one extra item) may have to be generated where the weight of i_1 is lower than the weight of each item of J. Since the aggressive discovery method checks only direct subsets of a candidate set, it may be the case that only J (and its direct subsets) are checked among all the subsets of $J_{i\_1}$. As a result, a potentially large number of itemsets (almost as many as the number of items) may be generated via a single itemset J.

The hybrid method, shown in FIG. 8, parallels the conservative and aggressive methods in most respects. However, in the hybrid method in general, additional itemsets that might not be counted under the aggressive method are counted and stored for later retrieval. For example, all supersets having itemsets of cardinality 2 or less may be counted, regardless of whether or not the itemset is a direct subset of the candidate superset. Accordingly, in this example the conservative method is used for itemsets of 2 or less, while the aggressive method is used for itemsets of 3 or more.

In FIG. 8, Steps 184–188 correspond to Steps 140–144 in the conservative method described above, and the detailed description of this part of the process need not be repeated here. However, in Step 190, the processor 2 computes the reduce support of each candidate set using a user selected cardinality for the conservative and aggressive methods. The weight of the candidate set is then compared with the reduced support computed in Step 190, to determine if the set should be classified as large or small (Step 192). A new large candidate set is determined, and its supersets are generated by processor 2. Under the hybrid method, all or some of the supersets are generated, based on the user's design choice of combining the conservative method with the aggressive method. In the example shown in FIG. 8, all supersets are generated for candidate sets containing 2-itemsets or less (conservative method). For candidate sets of 3-itemsets or greater, the aggressive method is used (Step 194).

Next, the support of the direct subsets of the superset generated in Step 194 is compared to the reduced weighted support (conservative or aggressive, depending on the cardinality, i.e., itemset number) to determine if the subset should be classified as large or small. For supersets containing 2-itemsets or less, all such supersets are checked for large or small status (Step 196). The large supersets are added to the hash tree structure (Step 198), and the remainder of process Steps 200–204 are followed in accordance with those of Steps 156–160 of the conservative strategy. Association rules are generated therefrom (Step 204).

Experimental runs on a database D by the inventors to generate association rules with weighted support based on the conservative method, aggressive method and hybrid method are shown in the following table:

| Item | Weight | Transactions |
|------|--------|--------------|
| A | 11 | ABCDE |
| B | 5 | CDE |
| C | 4 | DEG |
| D | 1 | DFG |
| E | 0 | BD |
| F | 0 | BCD |
| G | 0 | DEFG |
|   |    | AC |
|   |    | BCEF |
|   |    | BEFG |
|   |    | CFG |
|   |    | EFG |
|   |    | DEF |

| Generating Rule A → B | | | |
|---|---|---|---|
| | Minimum Support Threshold | Method | Itemsets Counted |
| WIS | 0.37 | Aggressive | 17 |
|   |   | Conservative | 24 |
|   |   | Hybrid | 23 |
| Apriori | 0.15 |   | 54 |

Assuming here that a large itemset J is generated by the aggressive strategy, all of its subsets I, I being a subset of J, may not have been counted, as noted above. Particularly if a subset I is not large and is not a direct subset of J, then it may not be counted. However, in the final step of association rule generation, it is not required in the present invention to know the count of I in order to test the confidence of the rule I→J−1. Note that the confidence of I→J−1 is tested because itemset J is large; rules from itemset I are not tested unless I is itself large. When an itemset J is found to be large, the processor 2 checks if each of its subsets is being counted; if it is not being counted, the processor 2 begins to count it.

Although the present invention has been described in detail with particular reference to preferred embodiments thereof, it should be understood that the invention is capable of other and different embodiments, and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only, and do not in any way limit the invention, which is defined only by the claims.

What is claimed:

1. In a data mining system, a method for identifying the presence of selected items and transactions contained in a plurality of records collectively stored in an electronic database, wherein said method comprises:

assigning preselected value weights to items and transactions;

reading each record in the electronic database in a substantially sequential flow;

counting the number of times each item appears throughout the plurality of records;

for each item counted, comparing a fraction of the cumulative weight of the records that include such item divided by the cumulative weight of all items in all records (weighted support), to a preselected support threshold;

generating sets of items including at least some of the items having said weighted support exceeding said preselected support threshold;

reading said records having a set of items whose weighted support exceeds said preselected support threshold;

counting the number of times each of said set of items appears throughout the plurality of records;

for each generated set of items, comparing the weighted support of said generated set of items to said preselected support threshold;

repeating the steps of generating new sets of items, reading records and comparing the weighted support of said generated set of items to said preselected support threshold until no new sets of items exceeding said preselected support threshold can be detected.

2. In a data mining system, the method according to claim 1 further comprises analyzing the sets of items detected in the records stored in the electronic database to formulate probability rules that are indicative of the frequency association between different items in the plurality of records.

3. In a data mining system, the method according to claim 1 wherein said weighted support of an itemset J ($w_s(J)$) is computed according to the formula:

$$w_s(J) = \Sigma_{t \in T, J \subseteq t} w(t) * (\Sigma_{j \in J}(w(j) + k)),$$

where w(t) is the weight of a transaction t, w(j) is the weight of an item j, k is a constant, where j ranges over each item contained in a transaction t, and T is defined as a set of t transactions.

4. In a data mining system, the method according to claim 1 comprising the assignment of weights to items, further comprises scaling said weighted support of a set of items by a ratio of the cumulative weight of the items in the itemset, divided by the cumulative weight of the items in the largest weight of the generated sets of items having at least some of the items of a weighted support exceeding said preselected support threshold.

5. In a data mining system, the method according to claim 4 comprising the assignment of weights to items, wherein said scaling of said weighted support is applied to generated sets of items up to a preselected number of items per set.

6. In a data mining system, the method according to claim 1 comprising the assignment of weights to items, further comprises scaling said weighted support of a set of items by a ratio of the cumulative weight of the items in the itemset, divided by the cumulative weight of the items in the largest weight of the generated sets of items having at least some of the items of a weighted support exceeding said preselected support threshold and which includes additional items of lower weights.

7. In a data mining system, the method according to claim 6 comprising the assignment of weights to items, wherein said scaling of said weighted support is applied to generated sets of items up to a preselected number of items per set.

8. In a data mining system, the method according to claim 1 comprising the assignment of weights to items, further comprises scaling the weighted support of a set of items for all sets below a preselected item size by a ratio of the cumulative weight of the items in the set of items, divided by the cumulative weight of the items in the largest weight of the generated sets of items, and scaling the weighted support of a set of items for all sets of items above the preselected item size by a ratio of the cumulative weight of the items in the set of items, divided by the cumulative weight of the items in the largest weight of a direct generated set of items up to a preselected item size.

9. In a data mining system, the method according to claim 1 comprising the assignment of weights to items, further comprises storing said value weights values in an electronic storage means.

10. A method of searching a collection of data records to detect records having sets of items (itemsets) and/or selected transactions, to form association rules corresponding to the itemsets detected based on weighted values assigned to the items and transactions, said method comprising the steps of:

a. reading data records in a seriatim manner;

b. assigning said weights to items and transactions;

c. incrementing a separate weight counter for each itemset and for each selected transaction detected in a record;

d. comparing the weighted support of an itemset and a selected transaction to a preselected support threshold;

e. generating new supersets from itemsets having a weighted support greater than the preselected support threshold;

f. reading the records identified as containing itemsets with a weighted support greater than the preselected support threshold;

g. incrementing a separate weight counter for each superset detected in a record;

h. comparing the weighted support of each superset to the preselected support threshold;

i. repeating steps a through h until every itemset has been counted; and j. creating association rules from the itemsets and selected transactions in steps a through i.

11. A method of searching a collection of data records according to claim 10 comprising the assignment of weights to items, further comprises scaling the weighted support of an itemset by a ratio of the cumulative weight of the items in the itemset, divided by the cumulative weight of the items in the largest weight superset up to a preselected itemset size.

12. A method of searching a collection of data records according to claim 10 comprising the assignment of weights to items, further comprises scaling the weighted support of an itemset by a ratio of the cumulative weight of the items in the itemset, divided by the cumulative weight of the items in the largest weight of a direct superset up to a preselected itemset size.

13. A method of searching a collection of data records according to claim 10 comprising the assignment of weights to items, further comprises scaling the weighted support of an itemset for all itemsets below a preselected itemset size by a ratio of the cumulative weight of the items in the itemset, divided by the cumulative weight of the items in the largest weight superset, and scaling the weighted support of an itemset for all itemsets above the preselected itemset size by a ratio of the cumulative weight of the items in the itemset, divided by the cumulative weight of the items in the largest weight of a direct superset up to a preselected itemset size.

14. A programmable general purpose computer apparatus for searching a file of records collectively stored in an electronic database, wherein said records contain at least one item, the search determining sets of items (itemsets) and searching for the generated itemsets among the records based on pre-selected weighted values assigned to the items and/or records, said apparatus comprising:

a processor means for performing decision making, control operations and data manipulation;

an array of memory storage means having address inputs and data inputs and outputs, for storing said records within said memory storage means during the search;

an address generation means having address outputs coupled to the address inputs of said memory storage means, for generating addresses to access different locations within said memory storage means; and an interface means having address inputs connected to the address outputs of said address generation unit.

15. A programmable general purpose computer apparatus for searching a file of records according to claim 14, further comprising a plurality of counters, wherein each of said counters stores a count of a separate itemset detected by said processor means.

16. A programmable general purpose computer apparatus for searching a file of records according to claim 14, further comprising a plurality of external storage devices coupled to said interface means, wherein records of said electronic database are stored in said external storage devices.

17. A method of searching a collection of data records to detect records having sets of items (itemsets) and/or selected transactions, to form association rules corresponding to the itemsets detected based on weighted values assigned to the items and transactions, said method comprising the steps of:

a) assigning said weights to items and transactions;

b) reading data records in a seriatim manner;

c) incrementing a separate weight counter for each itemset and a selected transaction detected in a record;

d) comparing the weighted support of an itemset and for each selected transaction to a preselected support threshold;

e) generating new supersets from itemsets having a weighted support greater than the preselected support threshold;

f) reading the records identified as containing itemsets with a weighted support greater than the preselected support threshold;

g) incrementing a separate weight counter for each superset detected in a record;

h) comparing the weighted support of each superset to the preselected support threshold;

i) repeating steps a through h until every itemset has been counted; and j) creating association rules from the itemsets and selected transactions in steps a through i.

18. A method of searching a collection of data records according to claim 17 comprising the assignment of weights to items, further comprises scaling the weighted support of an itemset by a ratio of the cumulative weight of the items in the itemset, divided by the cumulative weight of the items in the largest weight superset up to a preselected itemset size.

19. A method of searching a collection of data records according to claim 17 comprising the assignment of weights to items, further comprises scaling the weighted support of an itemset by a ratio of the cumulative weight of the items in the itemset, divided by the cumulative weight of the items in the largest weight of a direct superset up to a preselected itemset size.

20. A method of searching a collection of data records according to claim 17 comprising the assignment of weights to items, further comprises scaling the weighted support of an itemset for all itemsets below a preselected itemset size by a ratio of the cumulative weight of the items in the itemset, divided by the cumulative weight of the items in the largest weight superset, and scaling the weighted support of an itemset for all itemsets above the preselected itemset size by a ratio of the cumulative weight of the items in the itemset, divided by the cumulative weight of the items in the largest weight of a direct superset up to a preselected itemset size.

* * * * *